United States Patent Office 2,879,308
Patented Mar. 24, 1959

2,879,308

PRODUCTION OF ETHINYL VINYL CARBINOLS

Heinrich Pasedach, Ludwigshafen (Rhine), and Matthias Seefelder, Ludwigshafen (Rhine) Oppau, Germany, assignors to Badische Anilin- & Soda-Fabrik Aktiengesellschaft, Ludwigshafen (Rhine), Germany No Drawing. Application November 23, 1956
Serial No. 623,812

8 Claims. (Cl. 260—638)

This invention relates to a process for the production of ethinyl vinyl carbinols. In particular the invention relates to a process for the production of ethinyl vinyl carbinols in three stages from alpha.beta-olefinically unsaturated carbonyl compounds, according to which in the first stage the alpha.beta-unsaturated compound is reacted with a diene to the corresponding carbonyl compound saturated in alpha.beta-position, in the second stage this is converted by means of acetylene or acetylene compounds which have at least one free methine hydrogen atom into the corresponding acetylene alcohol, and the latter is then split up by thermal treatment into the initial diene and the vinyl ethinyl carbinol.

The reaction of saturated carbonyl compounds with acetylene to ethinyl carbinols is known. This method is not suitable for the production of ethinyl carbinols from the corresponding alpha.beta-unsaturated carbonyl compounds because these tend under the reaction conditions to polymerise or undergo condensation.

Acetylene has therefore hitherto been reacted in the form of its alkali compounds with alpha.beta-unsaturated carbonyl compounds in liquid ammonia as solvent. Satisfactory yields by this method are only obtained however by the use of the expensive lithium compound of acetylene. Moreover the use of liquid ammonia as a solvent offers considerable difficulty in the industrial production of ethinyl vinyl carbinols by reason of the expenditure on apparatus thereby involved.

We have now found that ethinyl vinyl carbinols are obtained in simple manner and in good yields by reacting alpha.beta-olefinically unsaturated carbonyl compounds with a diene, converting the resultant carbonyl compounds saturated in alpha.beta-position with acetylene or acetylene compounds having at least one free methine hydrogen atom into the corresponding acetylene alcohol and then splitting this up by thermal treatment into the initial diene and the ethinyl vinyl carbinol.

Suitable alpha.beta-olefinically unsaturated carbonyl compounds are for example acrolein, alpha-methylacrolein, crotonaldehyde, vinyl isopropenyl ketone, cinnamaldehyde, mesityl oxide, 2-methylenecyclohexanone, vinyl phenyl ketone and the like.

The reaction of alpha.beta-unsaturated carbonyl compounds with dienes to form ketones saturated in alpha.-beta-position is carried out in known manner according to Diels-Alder. In many cases the reaction proceeds without assistance. It is sufficient to allow the components to act on each other as such or in solution, for example in hydrocarbons or ethers at room temperature for a few hours. If more energetic conditions are necessary, it is sufficient to heat the components, similarly in solution or as such, for a longer period at elevated temperatures; in the case of readily volatile substances this preferably takes place in a pressure vessel.

As dienes there are suitable for example butadiene, isoprene, 2.3-dimethylbutadiene, cyclopentadiene, cyclohexadiene or anthracene, and also the alpha.beta-unsaturated carbonyl compound itself. In this case the products are not carbocyclic compounds but derivatives of dihydropyrane.

The ketones saturated in alpha.beta-position formed may be ethinylated with acetylene or acetylene compounds containing at least one free methine hydrogen atom under the usual conditions because they no longer tend to polymerise. The known ethinylation process is thus used.

In ethinylation with acetylene itself, the reaction is carried out in the presence of alkaline catalysts, in particular sodium and potassium compounds, as for example alkali hydroxides, alcoholates and amides. For example the carbonyl compound may be dissolved in a suspension or solution of the catalyst in an inert solvent and acetylene led in. Since it is not necessary to isolate the intermediate compounds, it is preferable to use the same solvent as in the Diels-Alder reaction.

The acetylene or acetylene compound can also be allowed to act directly on alkali metal and the monoalkali acetylide formed reacted with the carbonyl compound.

A further modification consists for example in allowing the acetylene or acetylene compound to act on an organo-metallic compound, as for example on ethyl magnesium bromide and reacting the acetylene metal compound formed with the carbonyl compound saturated in alpha.beta-position.

As acetylene compounds which have at least one free methine hydrogen atom there are suitable all acetylene compounds which have been formed by replacement of a hydrogen atom in the acetylene by an alkyl, aryl or aralkyl radical, and the alkyl and aralkyl radicals may also contain unsaturated linkages. Derivatives with functional groups, for example —$CH_2OH$, —COOH, —COOR, —$CH_2OR$, —$CH_2NR_2$, come into question. The following examples may be specified: methylacetylene, phenylacetylene, vinylacetylene, propargyl alcohol, propargyl ether, propiolic acid and its esters or propargylamine.

The acetylene alcohols prepared in this way are split up into the diene used and ethinyl vinyl carbinol by thermal treatment in liquid or vapor phase, surprisingly without side reactions. The splitting is preferably carried out by heating the acetylene alcohols, in so far as their boiling point lies high enough, in liquid form to temperatures above 300° C., the cleavage products being continuously distilled off. In the case of low-boiling acetylene alcohols the vapors can be led into a reaction chamber heated to the cleavage temperature of about 300° to 600° C. and the cleavage products condensed.

It is true that it is known that the adducts of the diene reaction could be split up again by thermal treatment into the initial materials, but it could not be foreseen that the unsaturated ethinyl carbinols would be stable at the necessary high temperatures and, moreover, that besides the splitting up of the diene components no further rearrangements or side reactions would occur.

The process according to this invention renders possible the industrial production of ethinyl vinyl carbinols by the detour through the diene adducts in a manner which is simple from the point of view of apparatus and in good yields. The ethinyl vinyl carbinols have hypnotic properties and are valuable intermediate products for the synthesis of vitamin A.

The following examples will further illustrate this invention but the invention is not restricted to these examples. The parts specified in the examples are parts by weight.

*Example 1*

418 parts of acrolein are introduced at room temperature into a solution of 490 parts of cyclopentadiene in 1000 parts of benzene. After standing for 12 hours there are obtained by distillation of the mixture at 73° C. under reduced pressure (22 torr), 850 parts of endomethylene tetrahydrobenzaldehyde. A solution of 790 parts of this aldehyde in 1000 parts of tetrahydrofurane is introduced at 0° C. within 4 hours into a suspension of 380 parts of sodium acetylide in 2000 parts of tetrahydrofurane. The mixture is stirred for 4 hours at room temperature and then poured into 600 parts of ice water. The aqueous layer is separated and the organic layer distilled after neutralization. 760 parts of (endomethylene-tetrahydrophenyl)-ethinyl carbinol are obtained at 113° to 114° C. (19 torr).

520 parts of this carbinol are dripped in the course of 6 hours into a porcelain tube filled with glass rings which is under a pressure of 60 to 70 torr and heated to 370° to 400° C.

The escaping vapors are collected in a cooled receiver and fractionally distilled. There are obtained 140 parts of cyclopentadiene, boiling point 40° to 41° C., 186 parts of pentene-(1)-ine-(4)-ol-(3) of the boiling point 74° C. (at 97 torr) and 128 parts of the initial carbinol.

Example 2

700 parts of methyl vinyl ketone and 735 parts of cyclopentadiene are reacted in the manner described in Example 1. 1170 parts of endomethylene tetrahydroacetophenone of the boiling point 77° to 78° C. at 13 torr are obtained.

940 parts of this ketone are reacted as described in Example 1 with 385 parts of sodium acetylide at 10° C. in tetrahydrofurane. 990 parts of (endomethyl-tetrahydrophenyl)-methyl-ethinyl carbinol of the boiling point 92° to 93° C. at 5 torr are obtained.

535 parts of this carbinol are split up in 7 hours at 380° to 400° C. in the porcelain tube described in Example 1. The distillation of the condensate gives 110 parts of cyclopentadiene, 178 parts of 3-methylpentene-(1)-ine-(4)-ol-(3) of the boiling point 64° C. at 76 torr and 177 parts of unchanged initial material.

Example 3

500 parts of 2-methyl-butene-(1)-one-(3) are boiled under reflux until the temperature of the liquid mixture has risen to 160° C. It is then distilled in vacuo. Besides a trivial first runnings of the monomer, there are obtained 470 parts of 2-acetyl-2.5.6-trimethyl-2.3-dihydropyrane of the boiling point 92° C. at 24 torr.

504 parts of this ketone are dissolved in 400 parts of dioxane and dripped while stirring at room temperature into a suspension of 200 parts of monosodium acetylide in 1000 parts of dioxane. The mixture is stirred for another 10 hours, water is added and, after separation of the aqueous layer and neutralization, the organic layer is distilled in vacuo. 495 parts of 3-(2'.5'.6'-trimethyl-2'.3'-dihydropyranyl-(2'))-butine-(1)-ol-(3) of the boiling point 56° to 58° C. at 0.25 torr are obtained.

200 parts of this alcohol are dripped in the course of 3 hours into a porcelain tube filled with glass rings which is under a pressure of 60 to 70 torr and is heated to 480° to 500° C. The escaping vapors are collected in a cooled receiver and fractionally distilled. 70 parts of 2-methyl-butene-(1)-one-(3), 50 parts of 2.3-dimethyl-pentene-(1)-ine-(4)-ol-(3) of the boiling point 66° to 70° C. at 65 torr and 44 parts of the initial carbinol are obtained.

Example 4

536 parts of endomethylene tetrahydroacetophenone, prepared as described in Example 2, are dissolved in a suspension of 450 parts of caustic potash powder in 1600 parts of tetrahydrofurane and treated with acetylene under pressure until no further absorption takes place. The mixture is hydrolysed with ice water, the organic layer neutralized after separation of the caustic potash solution and distilled in vacuo. 500 parts of (endomethylene-tetrahydrophenyl)-methyl-ethinyl carbinol of the boiling point 101° C. at 12 torr are obtained.

The carbinol is split up in the way described in Example 2.

What we claim is:

1. A process for the production of ethinyl vinyl carbinols which comprises reacting an alpha,beta-olefinically unsaturated carbonyl compound with a diene, converting the carbonyl compound saturated in alpha,beta-position thereby formed, in alkaline medium with an ethinyl compound from the group consisting of acetylene, lithium acetylide, sodium acetylide and potassium acetylide into the corresponding acetylene alcohol and splitting this up by thermal treatment at a temperature of about 300° to about 600° C. into the initial diene and the ethinyl vinyl carbinol.

2. A process as claimed in claim 1 wherein an alpha, beta-olefinically unsaturated aldehyde of the aliphatic series with 3 to 6 carbon atoms is reacted with a diene.

3. A process as claimed in claim 1 wherein an alpha, beta-olefinically unsaturated ketone of the aliphatic series with 4 to 7 carbon atoms is reacted with a diene.

4. A process as claimed in claim 1 wherein a vinyl methyl ketone is reacted with a diene, the resultant carbonyl compound saturated in alpha,beta-position is converted in alkaline medium with an ethinyl compound from the group consisting of acteylene, lithium acetylide, sodium acetylide and potassium acetylide, into the corresponding acetylene alcohol and this is split up by thermal treatment into the initial diene and 3-methyl-pentene-(1)-ine-(4)-ol-(3).

5. A proceess as claimed in claim 1 wherein vinyl methyl ketone is reacted with cyclopentadiene, the resultant carbonyl compound saturated in alpha,beta-position is converted in alkaline medium with an ethinyl compound from the group consisting of acetylene, lithium acetylide, sodium acetylide and potassium acetylide into 3-(2'.5'-endomethylene-1'.2'.5'.6'-tetrahydrophenyl)-butine-(1)-ol-(3) and this is split up by thermal treatment at 380° to 400° C. into cyclopentadiene and 3-methyl-pentene-(1)-ine-(4)-ol-(3).

6. A process as claimed in claim 1 wherein acrolein is reacted with cyclopentadiene and the endomethylene tetrohydrobenzaldehyde thereby formed is converted in alkaline medium with an ethinyl compound from the group consisting of acetylene, lithium acetylide, sodium acetylide and potassium acetylide into (endomethylene-tetrahydrophenyl)-ethinyl carbinol and this is split up by thermal treatment at 370° to 500° C. into cyclopentadiene and pentene-(1)-ine-(4)-ol-(3).

7. A process as claimed in claim 1 wherein the splitting off of the diene component is carried out in the gas phase at temperatures of 300° to 600° C.

8. A proceess for the production of ethinyl vinyl carbinols which comprises dimerising an alpha,beta-olefinically unsaturated carbonyl compound at elevated temperature, converting the resultant dihydropyrane compounds in alkaline medium with an ethinyl compound from the group consisting of acetylene, lithium acetylide, sodium acetylide and potassium acetylide, into the corresponding acetylene alcohol and splitting this up by thermal treatment at a temperature of about 300° to about 600° C. into the alpha,beta-olefinically unsaturated carbonyl compounds and the ethinyl vinyl carbinol.

References Cited in the file of this patent

UNITED STATES PATENTS 2,761,883     Smith et al.              Sept. 4, 1956

OTHER REFERENCES

Norton: Chemical Reviews, vol. 31, No. 2 (1942), pp. 391, 494, 507.

Johnson: "Acetylenic Alcohols," Arnold & Co., London, 1946, pp. 3–6.

Alder:—"Newer Methods of Preparative Org. Chem.," Interscience, N.Y., 1948, pp. 401–4, 485–90.